July 29, 1969  R. VILLALOBOS  3,457,773
CAPILLARY BYPASS COLUMN
Filed Dec. 22, 1966  2 Sheets-Sheet 1
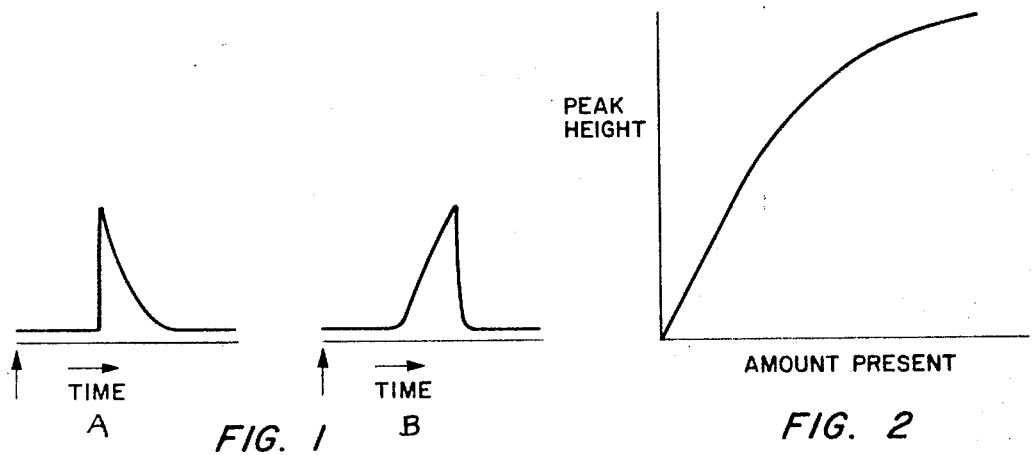
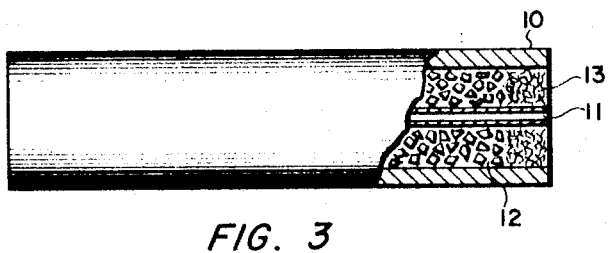
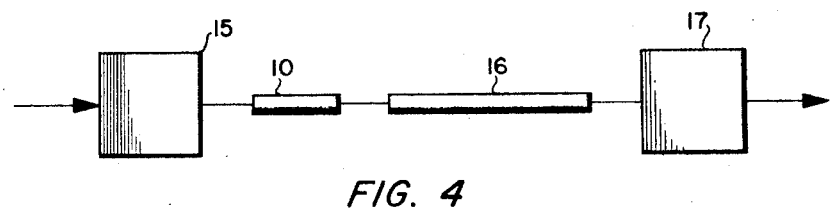
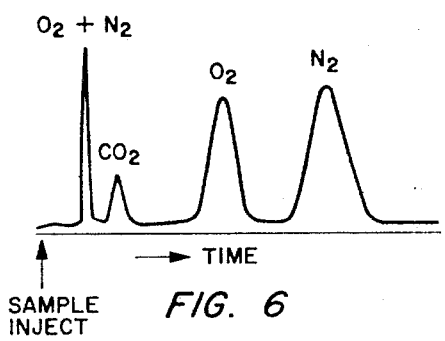
RICHARD VILLALOBOS
INVENTOR.
BY *Paul R. Harder*
ATTORNEY July 29, 1969  R. VILLALOBOS  3,457,773
CAPILLARY BYPASS COLUMN
Filed Dec. 22, 1966  2 Sheets-Sheet 2

RICHARD VILLALOBOS
INVENTOR.

BY *Paul L. Harder*

ATTORNEY

United States Patent Office 3,457,773
Patented July 29, 1969

3,457,773
CAPILLARY BYPASS COLUMN
Richard Villalobos, Fullerton, Calif., assignor to Beckman Instruments, Inc., a corporation of California
Filed Dec. 22, 1966, Ser. No. 603,890
Int. Cl. B01d *15/08;* G01n *31/08*
U.S. Cl. 73—23.1          6 Claims

ABSTRACT OF THE DISCLOSURE

There is disclosed a chromatographic column having an uncoated capillary extending therethrough whereby a small fraction of the sample passes through the column ahead of the larger fraction. The column about the capillary is packed with a suitable packing material for performing chromatographic separations. The capillary bypass column may be effectively utilized to prevent overloading of partition and absorption columns and in a single column stripper to obviate the requirement for a second switching valve for certain applications.

---

This invention relates to a capillary bypass chromatographic column and to gas chromatographic apparatus incorporating a capillary bypass column.

Bargraph reading gas chromatographs are widely used in process applications. The typical bargraph reading instument normally utilizes a linear chart paper requiring a calibration curve to convert the chart reading into the equivalent percent reading normally desired. In many instances the sensitivity requirements demand the use of large samples in situations where a major component in the sample is to be measured. Under these conditions overloading of the chromatographic column takes place resulting in skewed peaks on the chart paper for major components. FIG. 1(a) illustrates the type of skewed peak resulting from overloading a partition column and FIG. 1(b) illustrates a skewed peak resulting from overloading an adsorption column, both in somewhat exaggerated form. In each case, a plot of the peak height versus the amount of compound present results in a non-linear calibration curve as illustrated in FIG. 2. It is highly desirable that the calibration curve be linear to provide ready conversion from peak height to the quantity of the compound present.

Conventional practice of overcoming this problem has been to utilize a sample small enough that the component or components do not overload the column. Where sensitivity for minor components requires the use of larger samples, a second sample valve is required to deliver the smaller sample.

The capillary bypass column of the present invention effectively divides the sample into a larger and smaller fraction, placing the smaller fraction ahead of the larger in the chromatographic system. To accomplish this there is provided a thin-walled capillary tube placed in the center of a packed column. The flow rates through the packing and the capillary determine the ratio of the size of the fractions into which the sample is divided. The void volumes of the capillary and the packing are arranged such that the residence time of the smaller fraction in the capillary is very small compared to the residence time of the larger fraction in the packing. Consequently when the capillary bypass column is interposed between a sampling valve and a chromatographic column, the smaller fraction of the sample is introduced into the column ahead of the larger fraction and the component peaks from this smaller fraction reach the detector before the corresponding peaks from the larger fraction. A chromatogram including two peaks for each separated component, one resulting from the smaller fraction of the sample and one resulting from the larger fraction of the sample results. The void volumes of the capillary and the packing in the capillary bypass column can be arranged so that important peaks are not superimposed. It is then possible to measure the smaller peak when the larger of the two is skewed due to overloading or the larger may be measured when sensitivity is required.

The capillary bypass column may also effectively be utilized in a single column stripper obviating the need for a second switching valve by appropriately packing the capillary bypass column.

Other new and novel combinations of the capillary bypass column are disclosed hereinafter and a better understanding of the invention will become more apparent to those skilled in the art as the same becomes better understood by reference to the following detailed description when considered in connection with the accompanying drawings in which like reference numerals designate like parts throughout the figures thereof and wherein:

FIGS. 1(a) and 1(b) illustrate the skewed peaks resulting from overloading of partition and adsorption columns respectively;

FIG. 2 is a plot of peak height versus quantity of compound for skewed peaks:

FIG. 3 is a schematic diagram of a capillary bypass column constructed according to the present invention;

Figure 5:
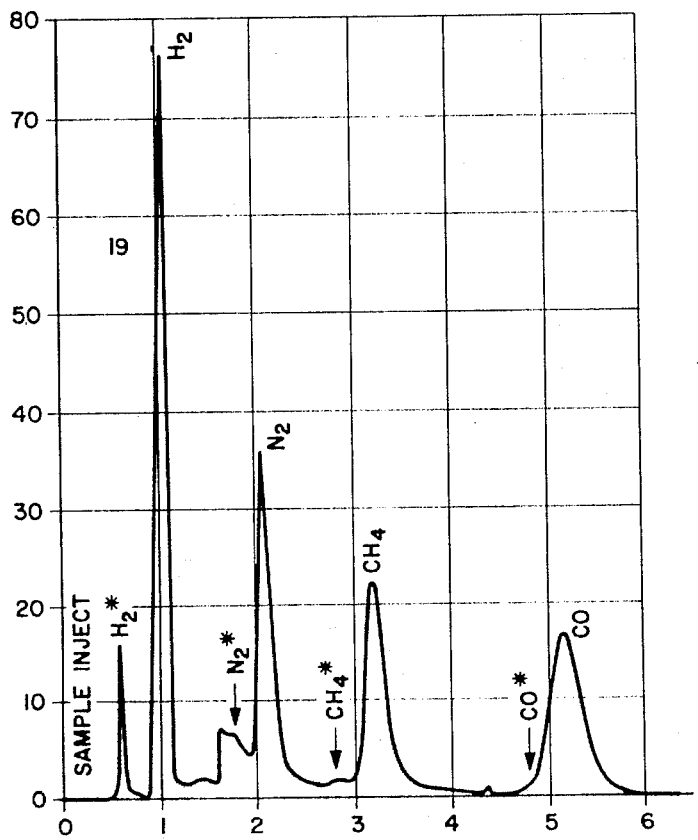
Figure 7:
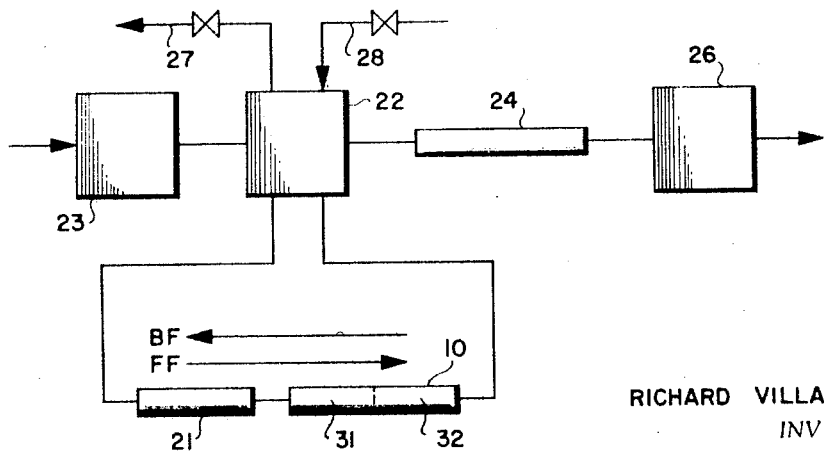

FIG. 4 schematically illustrates a chromatographic system utilizing a capillary bypass column of FIG. 3;

FIG. 5 is a chromatogram resulting from the system of FIG. 4;

FIG. 6 is a chromatogram from one typical analysis performed by the system of FIG. 5; and FIG. 7 illustrates a single column stripper utilizing the capillary column of the present invention.

Referring now to FIG. 3 there is illustrated a length of column tubing 10 partially in section containing a thin walled capillary 11 which extends the length of the tubing and communicates with the inlet and outlet ends thereof. The space between the capillary and the column tubing is packed with any suitable packing material 12, held in place by any suitable means such as a wad of glass wool 13. The nature of packing 12 will depend upon the particular application for which the column is to be utilized and may be an inert material such, for example, as dry, uncoated firebrick of the type commonly used as a solid support in gas chromatography or it may be an active adsorbent or partitioning substrate. The capillary 11 may be constructed of any suitable material, such, for example, as glass.

In use, if a carrier gas line is connected to the inlet end of the column it is obvious that the carrier gas will pass not only through the packed portion of the column but also through the capillary. When a sample is injected into the carrier gas a small fraction of the sample passes the capillary rapidly and elutes from the column ahead of the main body of the sample passing the packed portoin. The void volumes may be made such that the residence time of the small fraction in the capillary is very small compared to the residence time of the larger fraction in the packing. The flow rates through the packing in the capillary can be varied depending upon the size of the capillary and the density of the packing material as the choice of design may dictate.

Referring now to FIG. 4 there is illustrated a chromatographic system including the capillary by-pass column 10 interposed between a sampling valve 15 and a chromatographic column 16. A source of carrier gas, not shown, is connected to the sampling valve and the column 16 is connected directly to a detector 17 such as a thermal conductivity detector which may be vented to the atmosphere.

FIG. 5 illustrates a typical chromatogram for a sample containing nitrogen, methane, carbon monoxide and hydrogen obtained with argon carrier gas from the system of FIG. 4. The lower relative sensitivity of the thermal conductivity detector to nitrogen, methane and carbon monoxide dictates the utilization of a relatively large quantity of sample. This results in a badly skewed peak for hydrogen as illustrated by peak 19. The use of the capillary bypass column 10 allows the introduction of a smaller quantity of sample to the column 16 ahead of the major portion of the sample. This results in a chromatogram having two peaks for each of the components eluted by column 16, the smaller peak generated slightly ahead of the larger peak. In each case the smaller peak resulting from the smaller fraction passing the capillary by-pass column is identified in the chromatogram with an asterisk. The smaller peak for carbon monoxide is obscured by the larger peak. From the chromatogram it is possible to measure the quantity of hydrogen from the smaller unskewed peak while measuring the quantity of nitrogen, methane and carbon monoxide from the larger peaks. Since the ratio of the size of the fractions into which the sample is divided can be determined the actual quantity of hydrogen can be computed. Alternatively, the system can be calibrated with a calibration mixture of known composition.

An alternative form of the invention similar to that illustrated in FIG. 4 may conveniently be utilized where a sample contains one or more components which are irreversibly adsorbed by the substrate which is necessary for the separation of other components within the sample. In the past such a situation has required the utilization of a pair of columns and a bypass around one of the columns to perform the desired separation. If the capillary bypass column 10 is packed with a substrate 12 which performs a desired separation on the sample but which irreversibly adsorbs one or more components in the sample the capillary will bypass a small portion of the sample to a second column which may be utilized for separating the adsorbed components in the smaller fraction of the sample. A typical application for this system is the separation of carbon dioxide, oxygen and nitrogen. Molecular sieve, widely used for the separation of carbon dioxide, irreversibly adsorbs oxygen and nitrogen. On the other hand, silica gel utilized for separating nitrogen and oxygen retains carbon dioxide. This separation may simply and conveniently be performed by utilizing molecular sieve as the packing material 12 (FIG. 3) in the capillary bypass column and silica gel as the packing in column 16 (FIG. 4). With this arrangement, chromatograms similar to that illustrated in FIG. 6 result. A small portion of the sample passes the capillary bypass column and is separated in column 16 into two peaks, the first being oxygen plus nitrogen and the second being carbon dioxide. The carbon dioxide of the major portion of the sample is adsorbed in the molecular sieve of the capillary bypass column which separates the oxygen and nitrogen resulting in the third and fourth peaks of the chromatogram. Since the ratio of the fractions of the sample passing the capillary and the packing of column 10 is known the total quantities of oxygen, nitrogen and carbon dioxide can be determined.

Referring now to FIG. 7, there is illustrated a single column stripper incorporating a capillary bypass column. The single column stripper is commonly used for the purpose of separating heavy components from light components, backflushing the heavy components to vent while the light components are analyzed by a second column. The use of a capillary bypass column in this configuration obviates the requirement for a second switching valve for certain types of applications, for example those requiring two different types of columns to separate the components which are not backflushed. An example is a mixture of oxygen, nitrogen and carbon dioxide which requires molecular sieve to separate the oxygen and nitrogen and silica gel to separate the carbon dioxide with an additional valve to bypass the carbon dioxide around the molecular sieve to prevent irreversible adsorption. Such a separation has been discussed as an alternate to FIG. 4.

The single column stripper of FIG. 7 includes a capillary bypass column 10 connected downstream from a second column 21. The two columns are connected to a switching valve 22 which directs the flow of carrier gas passing through sampling valve 23 from a carrier gas source not shown through the two columns in the direction of the arrow FF (forward flow) and through a third chromatographic column 24 and detector 26. When the switching valve 22 is actuated the flow of carrier gas is reversed through the capillary bypass column 10 and column 21 in the direction indicated by the arrow marked BF (backflush) and to an auxiliary vent 27. Simultaneously an auxiliary source of carrier gas, not shown, is connected through inlet 28 to the third column 24 to maintain a flow of carrier gas through that column and the detector while the capillary column 10 and the second column 21 are backflushed.

The analysis of a typical flue gas containing a mixture of water, carbon dioxide, oxygen and nitrogen illustrates the capability of the system of FIG. 7. The capillary bypass column 10 is packed in two sections as indicated by the dashed lines with the upstream section 31 packed with silica gel and the downstream section 32 packed with molecular sieve. The molecular sieve separates the oxygen and nitrogen from each other in that portion of the sample which passes through the packing. The silica gel retains the carbon dioxide until the oxygen and nitrogen have traversed the molecular sieve section and have passed on to the third column 24 which is also packed with silica gel. The upstream column 21 is a partition column which retains water until the oxygen and nitrogen have traversed the molecular sieve section of the capillary bypass column. The capillary in the capillary bypass column allows a small portion of the sample (less the water retained in column 21) to bypass the packed silica gel and molecular sieve sections. The third column 24, also packed with silica gel, separates the carbon dioxide from the oxygen and nitrogen. Upon completion of the analysis, valve 22 is actuated and the carbon dioxide and water retained in columns 10 and 21 respectively are backflushed to the auxiliary vent 27. The chromatogram of FIG. 6 is also typical of this analysis.

There has been illustrated and described a novel capillary bypass column which serves to divide a sample into two fractions, one smaller than the other and delivers the smaller fraction to the balance of the system ahead of the larger fraction. The column also allows the smaller fraction to bypass a portion of the system. When incorporated in gas chromatographic systems the capillary bypass column has the advantage of reducing the number of valves required to carry out many analyses. Although the column has been described in connection with process gas chromatographs it is obvious that it may also be utilized in laboratory chromatographs to great advantage.

What is claimed is:

1. A chromatographic column comprising:
    chromatograph column tubing means having an inlet and an outlet;
    a packing material in said chromatograph tubing for separating the constituents of a fluid passing therethrough;
    an imperforate capillary tube supported within said column tube, said capillary tube extending through said packing material and having inlet and outlet openings respectively communicating with said chromatograph tubing means on opposite sides of said packing material whereby a portion of any fluid passing through said chromatograph column tubing means by-passes said packing material.

2. The chromatographic column of claim 1 further comprising:

means supporting said capillary tube in said chromatograph column tubing means; and said packing material surrounding said capillary tubing.

3. The chromatographic column of claim 2 wherein said packing material includes at least two different support materials.

4. A chromatographic system for the analysis of a sample comprising:

first chromatograph column means including a packing material therein and an imperforate capillary tube supported within said packing material and extending therethrough, said capillary tube having inlet and outlet openings respectively communicating with said chromatograph tubing on opposite sides of said packing material;

sampling means connected to said first chromatograph column means and adapted for connection to a source of carrier fluid;

detector means;

second chromatograph column means including a packing material therein, said second chromatograph column means connected in series between said first chromatograph column means and said detector means whereby a fraction of a sample is bypassed by said capillary tube to said second column without encountering the packing of said first chromatograph column means.

5. The chromatographic system of claim 4 wherein the packing in said first column means includes at least two active materials.

6. A single column stripper chromatographic system for the analysis of a sample comprising:

a first column having a packing therein;

a capillary bypass column connected downstream of said first column, said capillary bypass column including at least two packing materials and a capillary tube supported within said packing materials and extending therethrough;

a second column having a packing therein and connected to a detector means;

sampling means adapted for connection to a source of carrier gas;

valving means interconnecting said sampling means, said first column, said capillary bypass column, and said second column, and being adapted to be connected to a source of auxiliary carrier gas, said valving means having at least two positions, one of said positions interconnecting said sampling means, said first column, said capillary bypass column and said second column in seriatim, and said other position connecting said sampling means, said capillary bypass column and said first column in seriatim to a vent and said auxiliary source of carrier gas to said second column.

References Cited

UNITED STATES PATENTS

| | | | |
|---|---|---|---|
| 2,905,323 | 9/1959 | Megesi | 210—130 |
| 3,225,521 | 12/1965 | Burow | 55—197 X |
| 3,230,167 | 1/1966 | Golay | 55—386 X |
| 3,276,265 | 10/1966 | Taft | 55—386 X |
| 3,307,333 | 3/1967 | Norem et al. | 55—197 |

J. L. DE CESARE, Primary Examiner

U.S. Cl. X.R.

55—197